March 3, 1970  W. C. N. HOPKINS  3,498,633
VEHICLE ATTACHMENT FOR MOTORCYCLES
Filed Jan. 26, 1968  4 Sheets-Sheet 1

INVENTOR
WILLIAM C. N. HOPKINS

BY *Irons & Smiley*

ATTORNEYS

March 3, 1970 W. C. N. HOPKINS 3,498,633
VEHICLE ATTACHMENT FOR MOTORCYCLES
Filed Jan. 26, 1968 4 Sheets-Sheet 2
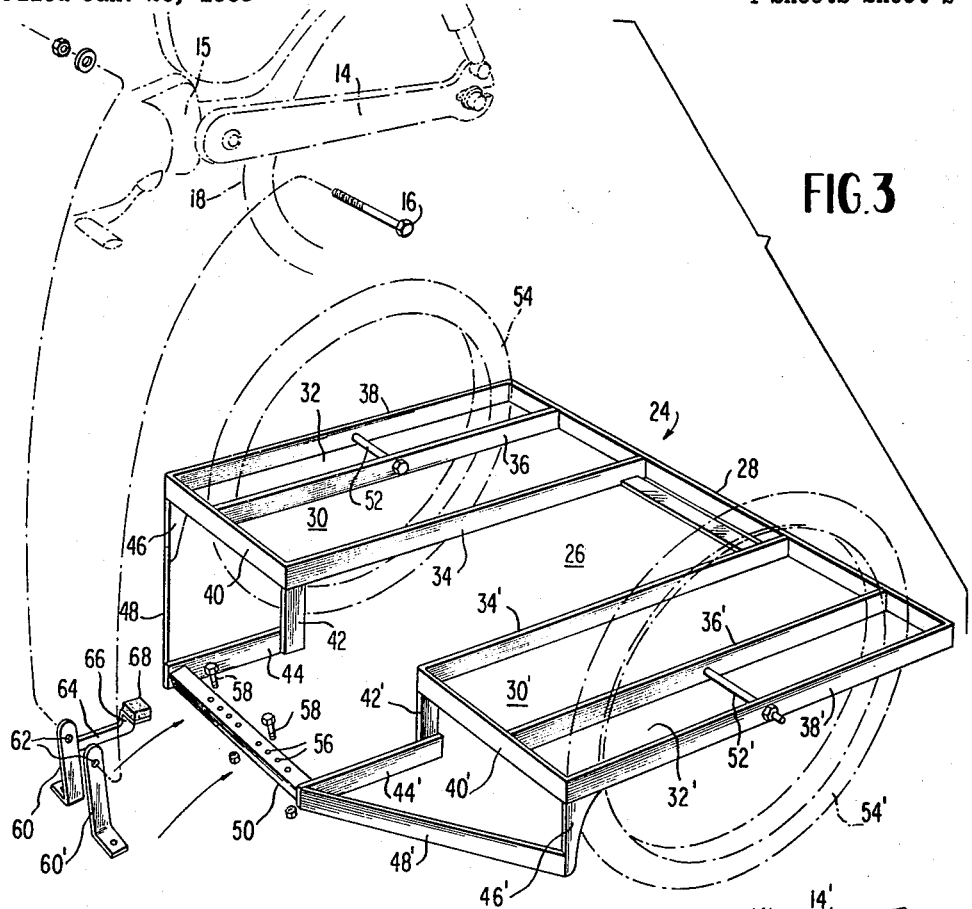
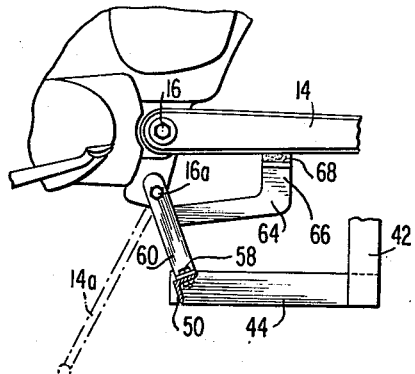
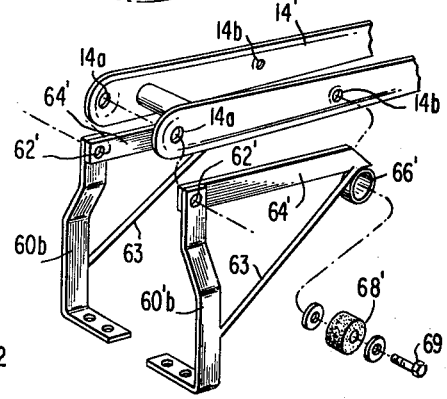
INVENTOR
WILLIAM C. N. HOPKINS
BY
ATTORNEYS March 3, 1970     W. C. N. HOPKINS     3,498,633
VEHICLE ATTACHMENT FOR MOTORCYCLES
Filed Jan. 26, 1968     4 Sheets-Sheet 3
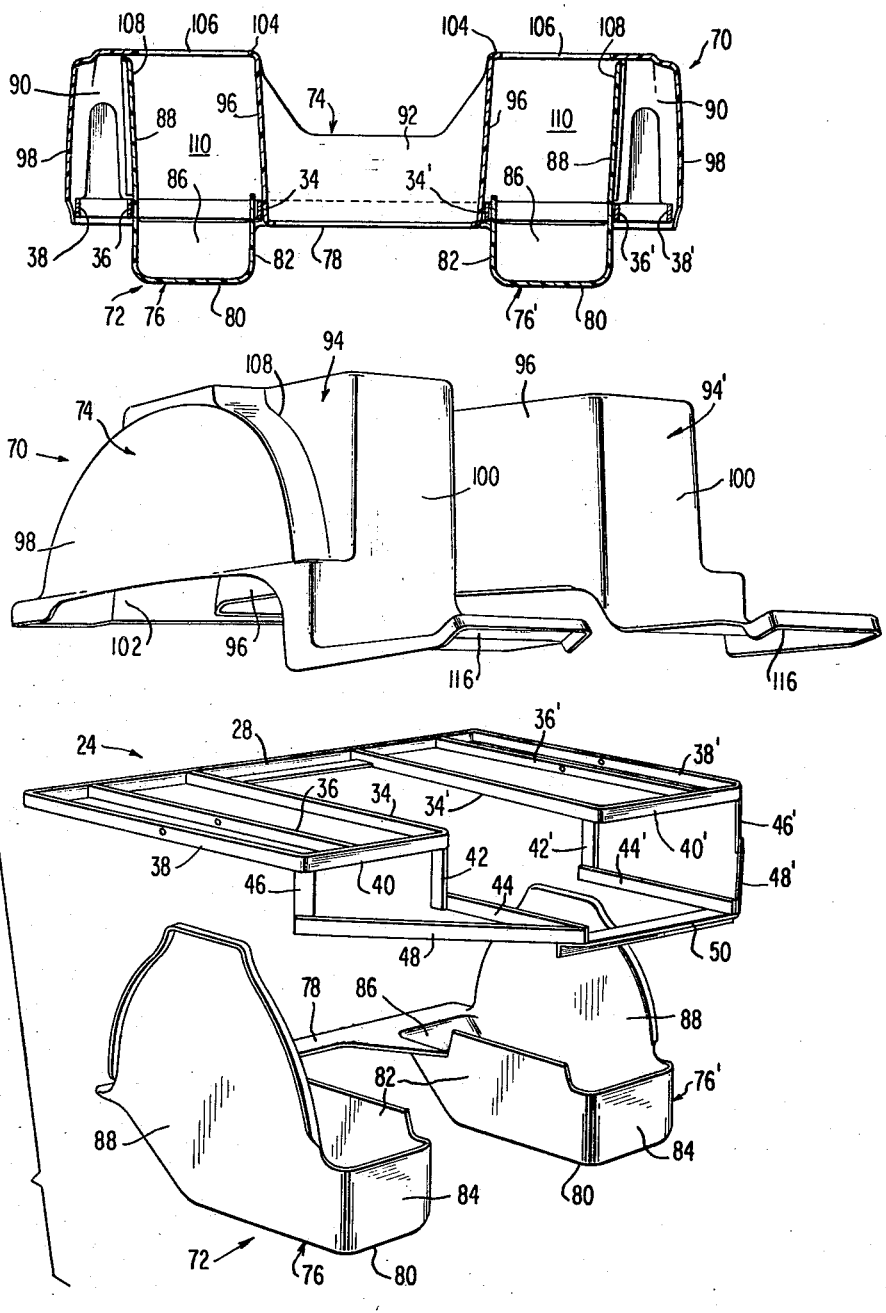
INVENTOR
WILLIAM C. N. HOPKINS
BY            ATTORNEYS March 3, 1970   W. C. N. HOPKINS   3,498,633
VEHICLE ATTACHMENT FOR MOTORCYCLES
Filed Jan. 26, 1968   4 Sheets-Sheet 4
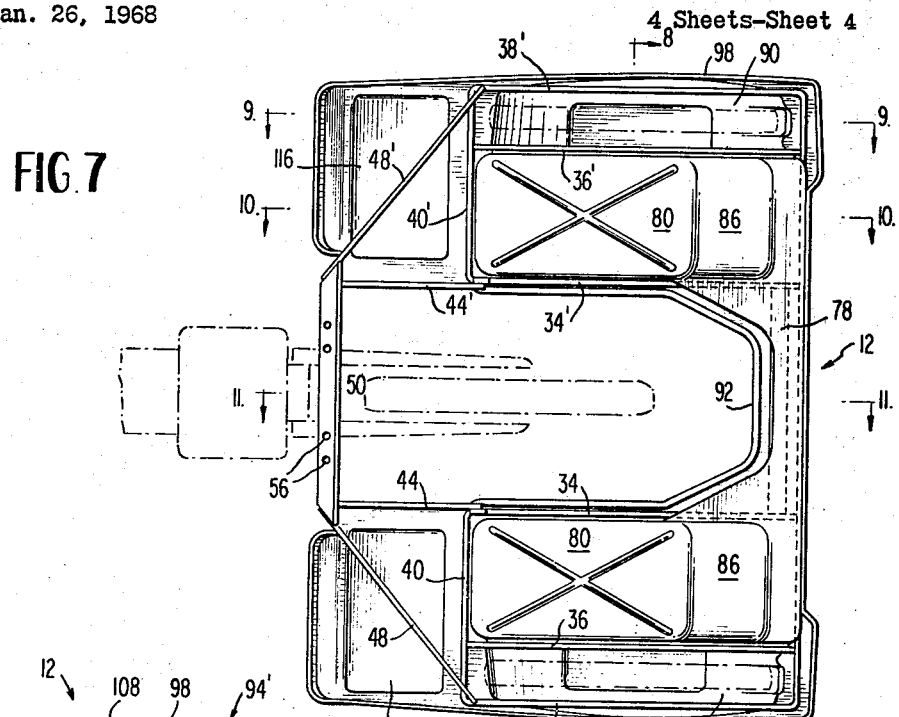
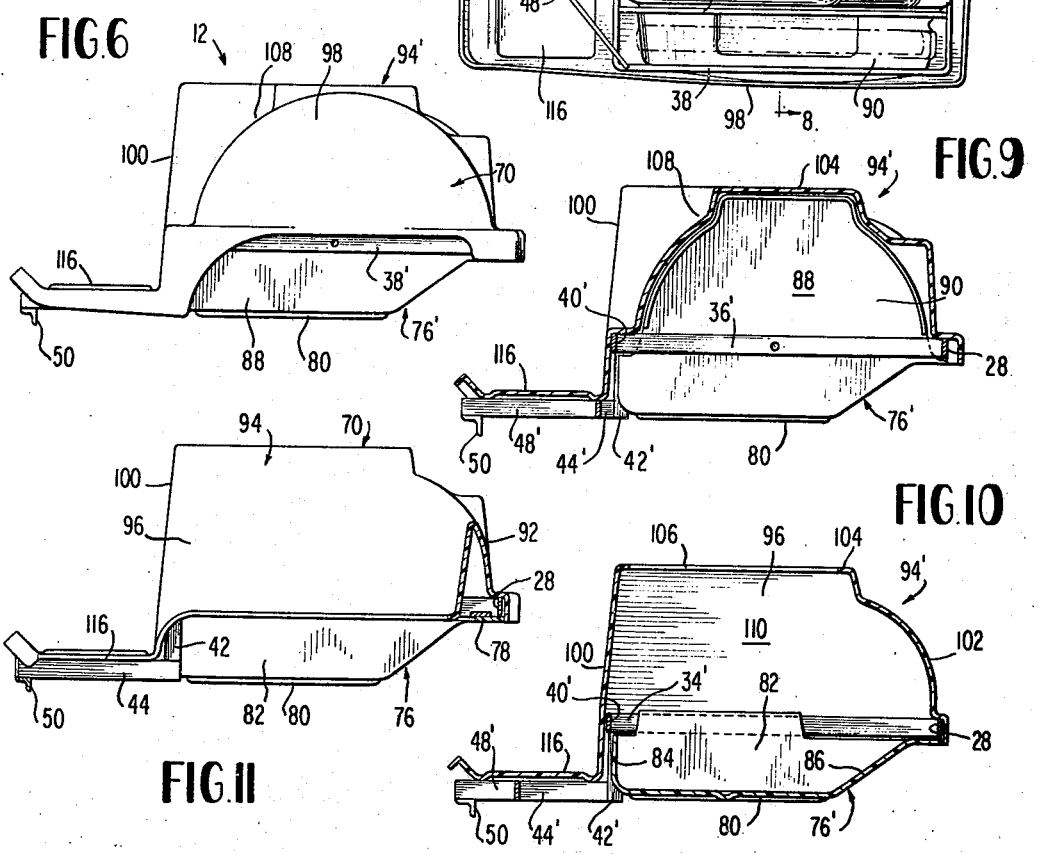
INVENTOR
WILLIAM C. N. HOPKINS
BY   Irvine & Smiley
ATTORNEYS

United States Patent Office 3,498,633
Patented Mar. 3, 1970

3,498,633
VEHICLE ATTACHMENT FOR MOTORCYCLES
William C. N. Hopkins, P.O. Box 551,
Walnut Creek, Calif. 94597
Filed Jan. 26, 1968, Ser. No. 700,908
Int. Cl. B62k *27/02;* B62h *27/12*
U.S. Cl. 280—204                              10 Claims

ABSTRACT OF THE DISCLOSURE

A two-wheeled vehicle attachment for motorcycles and pivotally connected adjacent the rear swing arm pivot of a motorcycle and having a stabilizing snubber engaging the swing arm, the attachment spanning the motorcycle rear wheel and providing a four-wheeled articulated vehicle having a double sidecar effect.

BRIEF SUMMARY OF THE INVENTION

This invention relates to a two-wheeled attachment for motorcycles which serves the purpose of effectively increasing the versatility of the motorcycle and, as well, provides for increased stability thereof.

The present invention materially adds to the load- and passenger-carrying capability of an ordinary motorcycle. The two-wheeled attachment incorporates a frame, auxiliary to that of the motorcycle, carrying a pair of road wheels and which frame is integrated with a body shell in such a way as to provide a pair of load supports including seat pedestals which also serve as load-carrying wells. Upper and lower body shell components cooperate with the frame to provide full fender wells for the road wheels and foot platforms for passengers in addition to the mentioned seat pedestals and storage wells.

The attachment spans or "wraps around" the rear motorcycle wheel with the road wheels and load supports on respectively opposite sides of the motorcycle rear wheel. These relationships also provide an extremely rigid unit for attachment to a motorcycle so that roadability and handling of the motorcycle attachment combination does not suffer. In effect, the attachment provides a four-wheeled vehicle with a center drive wheel, regardless of the positions of the wheels relative to ground level.

The attachment according to the present invention is also mounted with relation to the motorcycle at or near the pivot for the motorcycle rear swing arm with the road wheels. In this way, lateral forces affecting the road wheels of the attachment are transmitted to the motorcycle frame in the same fashion as lateral forces affecting the rear wheel of the motor cycle, that is, at the rear swing arm pivot. As far as vertical forces are concerned, the rear wheel of the motorcycle is free to operate in its usual fashion while the attachment is provided with a snubber engaging beneath the rear swing arm.

Thus, the road wheels of the attachment may drop or rebound independently of the motorcycle frame, upward movement of the road wheels is transmitted to the motorcycle swing arm. This not only precludes bouncing of the road wheels free of ground contact, but also acts automatically to reduce traction of the rear driving wheel of the motorcycle should the motorcycle attachment combination commence to lean and thereby pick up one of the road wheels of the attachment. This effect greatly increases the stability of the assemblage particularly if the front wheel of the motorcycle is turned too sharply when under motion. It also greatly increases stability while the assemblage is being towed.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 3 is an exploded perspective view of the attachment frame;

FIG. 4 is a fragmentary view in elevation showing a modified form of attachment;

FIG. 5 is an exploded perspective view of the attachment frame and body shells;

FIG. 6 is a side view in elevation of one side of the attachment;

FIG. 7 is a bottom plan view of the rear portion of the motorcycle and attachment;

FIGS. 8–11 are cross-sectional views taken, respectively on lines 8—8, 9—9, 10—10 and 11—11 of FIG. 7, and FIG. 12 is an exploded view in perspective of a modified attachment means and swing arms.

DETAILED DESCRIPTION

Figure 1:
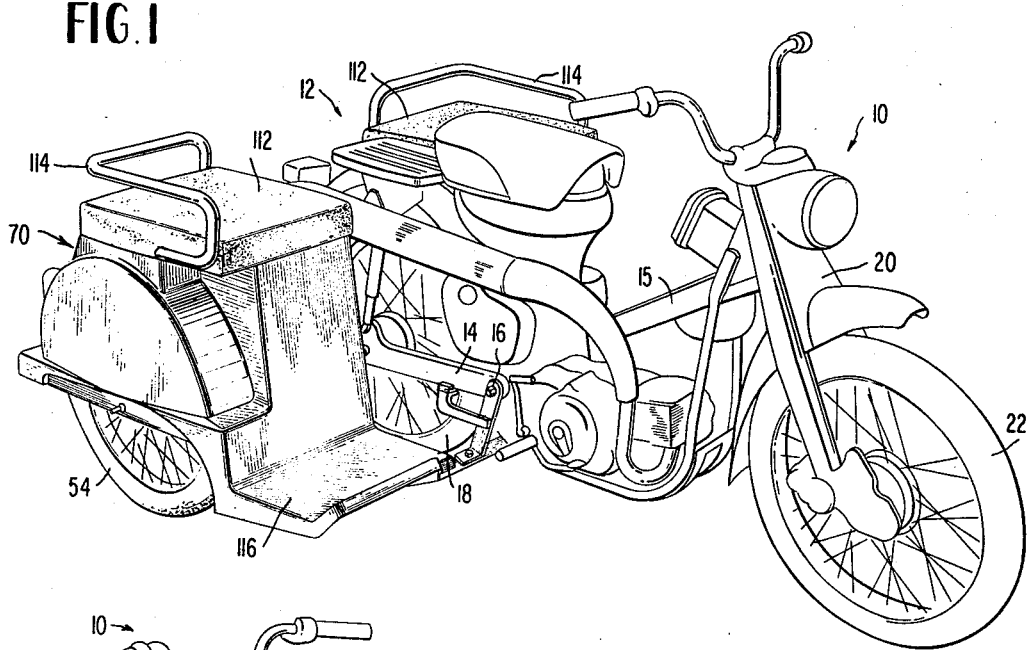
FIG. 1 is a front perspective view showing a motorcycle having the trailer attached.
Figure 2:
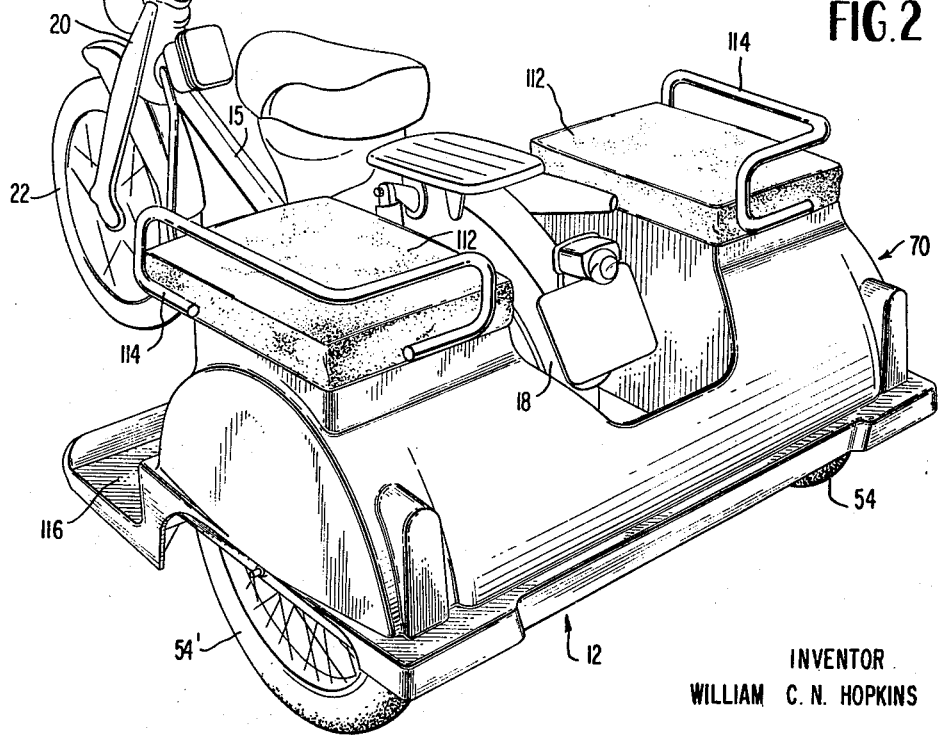
FIG. 2 is a rear perspective view of the assembly shown in FIG. 1.

Referring in detail to the drawings, specifically to FIGS. 1 and 2, a conventional motorcycle 10 is shown with the attachment 12 coupled thereto in accordance with the present invention. The motorcycle is provided with the usual rigid, U-shaped rear swing arm 14 pivotally attached to the motorcycle frame 15 by a swing arm pivot bolt 16. The swing arm 14 carries the rear drive wheel 18 and the front fork assembly 20 carries the dirigible front wheel 22. The attachment 12 is affixed to the motorcycle by means of the swing arm pivot bolt 16 and, like the swing arm, is free to pivot about the axis established by this bolt.

As can be seen best in FIG. 3, the attachment 12 comprises a frame 24 of open rectangular form to accommodate the rear wheel of the motorcycle within a central area 26, and includes a rear cross member 28 having spaced forwardly extending frame members defining spaced load areas 30, 30' on opposite sides of the rear wheel area 26, and two road wheel areas 32, 32' outwardly of the load areas 30, 30', respectively. The forwardly extending frame members include oppositely disposed pairs of members 34, 34' between the areas 26 and 30, 30', respectively, members 36, 36' between the areas 30, 30' and 32, 32', and outer side members 38, 38', respectively. The two groups of members 34, 36, 38 and 34', 36' 38' are joined as respective groups by front cross members 40, 40'.

Inner frame members 42, 42' depend from the juncture of the members 34, 40 and 34', 40', respectively, and have frame members 44, 44' extending forwardly from their lower ends, and outer frame members 46, 46' depend from the juncture of members 38, 40 and 38', 40', respectively, and have outer front frame members 48, 48' extending forwardly and inwardly from their lower ends with the other ends of said members 48, 48' rigidly secured to the front ends of the members 44, 44', respectively. The junctures of the members 44, 48 and 44', 48' are rigidly joined by a common front cross member 50. The forward portion of the frame, then, is stepped downwardly and allows the attachment to tip forwardly slightly so that the rear wheel of the motorcycle may easily be backed over the cross member 50, and allow the attachment to be affixed to the motorcycle.

Each pair of side members 36, 38 and 36', 38' carries an axle bolt 52, 52', respectively, by means of which road wheels 54, 54' are journaled in the frame 24, and the front cross member 50 is adapted for connection to the motorcycle frame 15. Whereas the frame members 28–48, 28–48' may comprise flat bars with their widths disposed vertically, the front cross member 50 preferably comprises a reinforced bar, such as an angle bar, and this bar is tilted slightly, as shown in FIG. 4, so that its upper flange is slightly tilted forwardly. The front cross member 50 may be provided with a series of holes 56 for receiving a pair of bolts 58 for selectively mounting a pair of uprights 60, 60' which straddle the motorcycle frame 15, and have apertures 62 at their upper ends to accommodate the swing arm pivot bolt 16. Alternatively, the uprights 60, 60' may be connected to the pivot bolt 16a for the conventional center kick stand 14a, FIG. 4. The series of holes 56 enable selective spacing of the uprights 60, 60' to accommodate for various widths of different motorcycles.

At least one of the uprights 60, 60' is provided with a rearwardly projecting arm 64 carrying a rearwardly and inwardly directed bracket 66 which mounts a block 68 of resilient material and upon which the adjacent rear swing arm 14 of the motorcycle is adapted to lightly rest, FIGS. 1 and 4, when the operator is mounted on the motorcycle. This allows the rear swing arm to operate in the usual fashion while transmitting bump motions of the road wheels 54, 54' to the swing arm. Rebound motion of the road wheels is independent of the swing arm while rebound motion of the swing arm will be absorbed beyond the normal position by the resilient block 68. These actions greatly enhance the stability of the assembly. Upward or bump movement of the attachment is absorbed and controlled by the usual spring and shock absorber mounting for the rear swing arm while any tendency for the assembly to lean or tip will immediately raise the rear wheel of the motorcycle so that it automatically loses traction to correct the tipping condition.

The body 70 of the attachment, FIG. 5, includes a lower shell section 72 and an upper shell section 74. Each section includes two sides portions which are identical and are joined by a cross portion at the rear thereof. The lower section 72 has side portions 76, 76' which are dimensioned to fit within the confines of the open areas 30 and 30' of the frame 24, see FIGS. 5–8, and these side portions are joined by a cross portion 78. Further, each side portion of the lower section presents a storage well bottom 80 bounded by an inner upstanding side wall 82, front wall 84, rear wall 86 and an outer side wall 88 that extends upwardly to form one side of a road wheel well 90 above the frame areas 32, 32'.

The upper section 74 has a center portion 92 joining opposite side portions 94, 94' each of which includes inner and outer depending walls 96 and 98, respectively, front and rear depending walls 100 and 102, respectively, and an upper deck 104 having an opening 106 therein. The outer side walls 98 have inset portions 108 which nest with the lower section outer side walls 88 to define the road wheel wells 90. The walls 88, 96, 100 and 102 cooperatively define storage wells 110 above the well bottoms 80, and access to which may be gained through the openings 106.

The storage wells 110 may be closed by seat members 112 removably covering the openings 106, preferably being hingedly secured along their rear edges to the rear portions of the upper decks 104. Preferably, guardrails 114 are secured to the seat members to extend around their outer and rear sides. The front walls 100 extend downwardly below the remainder of the upper section 74 to be disposed in front of the depending frame members 42, 46 and 42', 46', respectively, and these front walls terminate in forwardly projecting footrest portions 116 which overlie the forward frame members 44, 48 and 44', 48', respectively.

The body sections 72, 74 may be fabricated of any suitable material such as metal or synthetic plastic. It has been found that body shells formed of fiberglass reinforced plastic are highly suitable and provide strength without materially increasing weight. Obviously, the body sections 72, 74 and frame 24 may be secured in a rigid integral unit by any suitable means, such as bolts or rivets, but if the body shells constitute plastic, they may be bonded, with the frame members sandwiched between overlapping portions, by solvents so that the complete body becomes integral.

A modified attachment means is shown in FIG. 12 as comprising a pair of upstanding angle brackets 60b, 60b' each having a rearwardly extending arm 64' strengthened by a diagonally disposed brace 63. Bolt holes 62' are provided in the apex portion of each bracket, and a sleeve 66' is secured to the free end of each arm 64' to receive an annular resilient snubber bushing 68'. The motorcycle swing arms 14' are each provided with the usual bolt hole 14a to receive the pivot bolt, and each arm is also provided with a bolt hole 14b disposed to be axially aligned with the axis of the respective sleeve 66' for reception of a bolt 69 extending through the bushing 68'. This arrangement snubs upward movement of the motorcycle rear wheel, as well as upward movement of the auxiliary frame.

Although certain specific embodiments of the invention have been shown and described, it is obvious that many modifications thereof are possible. For example, the body, as shown and described, is primarily for personnel transport, but it may be adapted primarily for freight transport by providing merely a floor with upstanding side walls, as required. Similarly, the brackets 60–68 may be modified for attachment to motorcycles of different types and makes.

I claim:
1. In combination with a motorcycle having a frame, front and rear wheels mounted to said frame, a pivot bolt carried by said frame intermediate said wheels, and a part pivotally supported by said bolt,
  an auxiliary frame of generally rectangular plan view having an open center section receiving said motorcycle rear wheel, said auxiliary frame having oppositely disposed pairs of side members each carrying an axle, an auxiliary support wheel journaled on each axle, and means pivotally connecting said auxiliary frame at its forward end to said motorcycle frame pivot bolt.

2. In the combination of claim 1, said motorcycle rear wheel being carried by a rear swing arm,
  and resilient snubber means fixed to said auxiliary frame and engaging said swing arm.

3. In the combination of claim 2, said means pivotally connecting said auxiliary frame to said motorcycle frame comprising a pair of upstanding arms at the front of said auxiliary frame in straddling relation to said motorcycle frame and attached to said pivot bolt, and
  said resilient snubber means comprising an angularly disposed arm extending rearwardly from at least one of said upstanding arms and carrying a resilient snubber element.

4. In the combination of claim 1, said part pivotally supported by said bolt constituting a rear swing arm journaling said motorcycle rear wheel.

5. In the combination of claim 1, said part pivotally supported by said bolt constituting a center kick stand.

6. A vehicular attachment for motorcycles comprising,
  an auxiliary frame of generally rectangular plan view having an open center section, open fender well sections at opposite sides thereof, and open storage well sections between each fender well section and the center section,
  a body shell assembly comprising upper and lower sections, each lower section having opposite side portions each consisting of a bottom wall and upwardly extending side walls received within a corresponding fender well section, each upper section having opposite side sections consisting of a top deck and depending side walls nested over the frame and a corresponding side of the lower section, said body shell sections and said auxiliary frame being joined to present a rigid, integral unit, a road wheel journaled within each fender well section of the frame, and means at the forward end of the auxiliary frame for pivotal attachment on a horizontal transverse axis to a motorcycle frame.

7. The attachment as defined in claim 6 including resilient snubber means connected to said auxiliary frame for engaging a rear swing arm of an associated motorcycle.

8. The attachment as defined in claim 6 wherein each top deck is provided with an opening above a corresponding bottom wall, and a seat hingedly mounted on each top deck normally to close such opening.

9. The attachment as defined in claim 8 comprising foot rests extending forwardly beneath each seat.

10. The attachment as defined in claim 9 comprising rails disposed above and extending along the outer side and back of each seat.

References Cited

UNITED STATES PATENTS

| | | | |
|---|---|---|---|
| 854,432 | 5/1907 | Rothgiesser | 180—21 |
| 1,063,864 | 6/1913 | Edwards et al. | 280—203 |
| 1,167,286 | 1/1916 | Foley | 280—7.1 |
| 1,311,816 | 7/1919 | Heintz | 280—204 |
| 2,865,656 | 12/1958 | Musgrave | 280—203 |
| 3,164,396 | 1/1965 | Morris | 280—202 |
| 3,271,048 | 9/1966 | Beesley et al. | 280—63 |

FOREIGN PATENTS

| | | |
|---|---|---|
| 693,690 | 7/1940 | Germany. |

KENNETH H. BETTS, Primary Examiner